G. A. BRIGHAM.
Sewing Machine Thread Waxer.
No. 23,752.
Patented April 26, 1859.
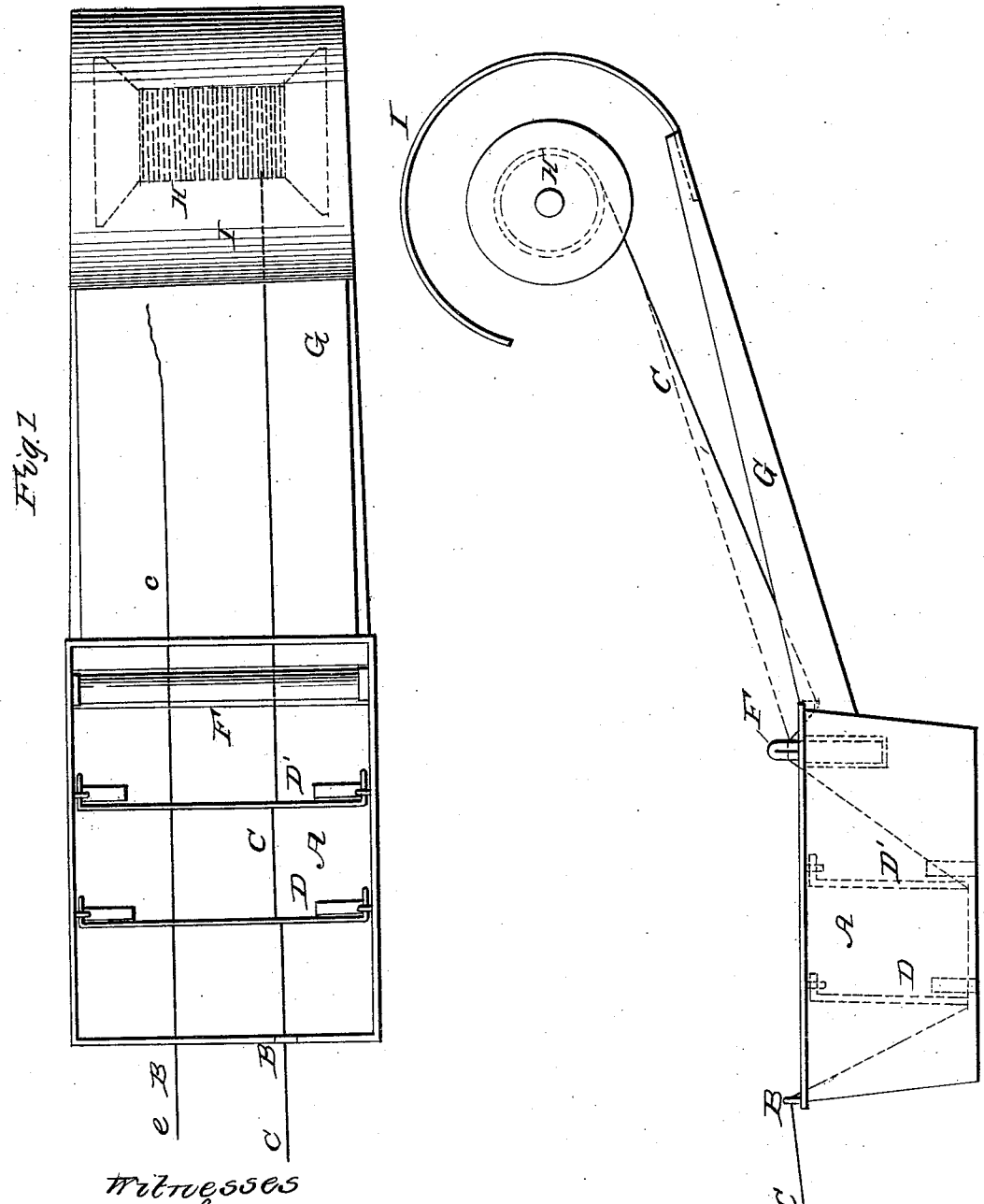

UNITED STATES PATENT OFFICE.

GEO. A. BRIGHAM, OF MARLBOROUGH, MASSACHUSETTS.

IMPROVEMENT IN DISHES FOR WAXING THREAD.

Specification forming part of Letters Patent No. 23,752, dated April 26, 1859.

*To all whom it may concern:*

Be it known that I, GEORGE A. BRIGHAM, of Marlborough, in the county of Middlesex, State of Massachusetts, have invented certain new and useful Improvements in Waxing-Dishes for Waxing Thread for Sewing-Machines; and I do hereby declare the following to be a full, clear, and exact description of the same, reference being had to the accompanying drawings, in which—

Figure 1 is a plan or top view; Fig. 2, a side view or elevation, the same letters referring to the same parts in both.

A is the dish, in which the wax is heated or otherwise prepared for the thread C.

B B are guides on the edge of A, through which the thread is passed to guide it into the dish.

D D' are two wires placed near the bottom of the dish A, and forming guides for the thread to hold it down into the wax while passing between them.

F is the wiper or rubber for wiping the superfluous wax from the thread, and G is a trough or dripper opening at its lower end into the dish A and extending up to reach under the spool H at such inclination as to return all it receives back to A.

I is a guard extending up from the upper end of G around the spool to catch any drops that might be carried to the spool and thrown off by its motion.

The operation is plain. The thread C is passed from the guide B down under the wires D and D', to become thoroughly saturated, and then up by the rubbers in the common way to the spool H. Any drops carried by the rubber or up to the spool and dropping or thrown off are caught by the guard or dripper and returned to the dish A.

What I claim as new, and desire to secure by Letters Patent, is—

The combination of the guard I, the dripper G, and the guides B, with the two wires D and D', to be placed in the dish to hold the thread, in the manner and for the purposes as set forth and described.

GEO. A. BRIGHAM.

Witnesses:
   A. C. FELTON,
   WM. BARNES.